(12) United States Patent
McCaughey et al.

(10) Patent No.: US 9,112,584 B2
(45) Date of Patent: Aug. 18, 2015

(54) EXTERNAL CASE FOR REDISTRIBUTION OF RF RADIATION AWAY FROM WIRELESS COMMUNICATION DEVICE USER AND WIRELESS COMMUNICATION DEVICE INCORPORATING RF RADIATION REDISTRIBUTION ELEMENTS

(71) Applicant: ANTENNA79, INC., Encinitas, CA (US)

(72) Inventors: Ryan G. McCaughey, Encinitas, CA (US); Karl Richard Shields, Oceanside, CA (US); Nikhil Nilakantan, Oceanside, CA (US)

(73) Assignee: Antenna79, Inc., Encinitas, CA (US)

( * ) Notice: Subject to any disclaimer, the term of this patent is extended or adjusted under 35 U.S.C. 154(b) by 0 days.

(21) Appl. No.: 14/610,055

(22) Filed: Jan. 30, 2015

(65) Prior Publication Data
US 2015/0141089 A1 May 21, 2015

Related U.S. Application Data

(63) Continuation of application No. 13/287,680, filed on Nov. 2, 2011, now Pat. No. 8,957,813, which is a continuation-in-part of application No. 12/724,290, filed on Mar. 15, 2010, now Pat. No. 8,214,003, which (Continued)

(51) Int. Cl.
*H01Q 1/24* (2006.01)
*H04B 1/3827* (2015.01)

(52) U.S. Cl.
CPC .................. *H04B 1/3838* (2013.01)

(58) Field of Classification Search
USPC ......................... 343/702, 782, 834; 455/575.5
See application file for complete search history.

(56) References Cited

U.S. PATENT DOCUMENTS

| | | |
|---|---|---|
| 5,278,571 A | 1/1994 | Helfrick |
| 5,338,896 A | 8/1994 | Danforth |
| 5,550,552 A | 8/1996 | Oxley |
| 5,711,014 A | 1/1998 | Crowley et al. |
| 5,726,383 A | 3/1998 | Geller et al. |

(Continued)

FOREIGN PATENT DOCUMENTS

| | | |
|---|---|---|
| CN | 1918745 A | 2/2007 |
| CN | 102130371 | 7/2011 |

(Continued)

OTHER PUBLICATIONS

Office Action for U.S. Appl. No. 12/614,132, mailed Oct. 20, 2011.

(Continued)

*Primary Examiner* — Tan Ho
(74) *Attorney, Agent, or Firm* — Cooley LLP

(57) ABSTRACT

A case for a wireless tablet computer device includes a number of RF resonant loop elements and elongated RF director coupling strip elements mounted in the case and configured such that RF radiation is coupled from an internal antenna of the wireless device out of the device to the RF resonant and coupling elements. The case incorporates a cut-out section in a location leaving exposed a strip that covers an area proximate the internal antenna. The RF resonant loops and director coupling strip elements alternatively may be incorporated with the wireless tablet computer device itself.

20 Claims, 14 Drawing Sheets

Related U.S. Application Data is a continuation-in-part of application No. 12/614,132, filed on Nov. 6, 2009, now Pat. No. 8,208,980.

(60) Provisional application No. 61/160,282, filed on Mar. 13, 2009, provisional application No. 61/112,141, filed on Nov. 6, 2008, provisional application No. 61/158,551, filed on Mar. 9, 2009.

(56) References Cited

U.S. PATENT DOCUMENTS

| | | |
|---|---|---|
| 5,777,261 A | 7/1998 | Katz |
| 5,787,340 A | 7/1998 | Sepponen |
| 6,031,495 A | 2/2000 | Simmons et al. |
| 6,082,535 A | 7/2000 | Mitchell |
| 6,249,256 B1 | 6/2001 | Luxon et al. |
| 6,341,217 B1 | 1/2002 | Wong |
| 6,359,213 B1 | 3/2002 | Long |
| 6,492,957 B2 | 12/2002 | Carillo, Jr. et al. |
| 6,515,223 B2 | 2/2003 | Tashjian |
| 6,568,576 B1 | 5/2003 | Godshaw et al. |
| 6,576,832 B2 | 6/2003 | Svarfvar et al. |
| 6,603,430 B1 | 8/2003 | Hill et al. |
| 6,603,981 B1 | 8/2003 | Carillo, Jr. et al. |
| 6,615,026 B1 | 9/2003 | Wong |
| 6,677,906 B2 | 1/2004 | Quinn et al. |
| 6,711,387 B1 | 3/2004 | Lungley |
| 6,768,523 B2 | 7/2004 | Cheng et al. |
| 6,855,883 B1 | 2/2005 | Matsui |
| 6,856,819 B2 | 2/2005 | Itoh |
| 6,871,079 B1 | 3/2005 | Choi et al. |
| 6,880,737 B2 | 4/2005 | Bauer |
| 6,924,770 B2 | 8/2005 | Carpenter et al. |
| 6,947,000 B2 | 9/2005 | Ito |
| 6,950,674 B2 | 9/2005 | Jarrett |
| 6,980,777 B2 | 12/2005 | Shepherd et al. |
| 6,985,110 B2 | 1/2006 | Tanaka et al. |
| 7,031,762 B2 | 4/2006 | Shoji et al. |
| 7,065,379 B1 | 6/2006 | Kim et al. |
| 7,164,933 B1 | 1/2007 | Steigerwald et al. |
| 7,202,825 B2 | 4/2007 | Leizerovich et al. |
| 7,203,533 B1 | 4/2007 | Tischer |
| 7,206,618 B2 | 4/2007 | Latto |
| 7,230,574 B2 | 6/2007 | Johnson |
| 7,327,841 B2 | 2/2008 | Schreiber et al. |
| 7,494,069 B2 | 2/2009 | Shimada |
| 7,541,986 B2 | 6/2009 | Park |
| 7,812,770 B2 | 10/2010 | Qi et al. |
| 8,068,061 B2 | 11/2011 | Qi et al. |
| 8,208,980 B2 | 6/2012 | Wong et al. |
| 8,214,003 B2 | 7/2012 | Wong et al. |
| 8,325,094 B2 | 12/2012 | Ayala Vazquez et al. |
| 8,442,602 B2 | 5/2013 | Wong et al. |
| 8,698,674 B2 * | 4/2014 | Lai et al. ............... 343/700 MS |
| 8,750,948 B2 | 6/2014 | Wong et al. |
| 8,957,813 B2 * | 2/2015 | McCaughey et al. ......... 343/702 |
| 2002/0009976 A1 | 1/2002 | Rashidi |
| 2002/0074142 A1 | 6/2002 | Katz |
| 2002/0183013 A1 | 12/2002 | Auckland et al. |
| 2002/0193136 A1 | 12/2002 | Halkosaari et al. |
| 2003/0078037 A1 | 4/2003 | Auckland et al. |
| 2004/0014506 A1 | 1/2004 | Kemppinen |
| 2005/0079820 A1 | 4/2005 | Yamashita |
| 2005/0104782 A1 | 5/2005 | Peled et al. |
| 2005/0195119 A1 | 9/2005 | Gaucher et al. |
| 2006/0019696 A1 | 1/2006 | Brunel et al. |
| 2006/0022889 A1 | 2/2006 | Chiang et al. |
| 2006/0232483 A1 | 10/2006 | Iwai et al. |
| 2006/0290575 A1 | 12/2006 | Pelzer |
| 2007/0004456 A1 | 1/2007 | Shimada |
| 2007/0241977 A1 | 10/2007 | Vance |
| 2008/0007468 A1 | 1/2008 | Sato et al. |
| 2008/0165064 A1 | 7/2008 | Hill et al. |
| 2008/0316111 A1 | 12/2008 | Aoyama et al. |
| 2009/0066586 A1 * | 3/2009 | Rao et al. ............... 343/702 |
| 2009/0124215 A1 | 5/2009 | Nysen |
| 2009/0156151 A1 | 6/2009 | Anguera et al. |
| 2009/0318094 A1 | 12/2009 | Pros et al. |
| 2010/0033383 A1 | 2/2010 | Yamamoto |
| 2010/0097286 A1 | 4/2010 | Morrow et al. |
| 2010/0113111 A1 | 5/2010 | Wong et al. |
| 2010/0214180 A1 | 8/2010 | Krogerus |
| 2010/0216520 A1 | 8/2010 | Lee |
| 2010/0234081 A1 | 9/2010 | Wong et al. |
| 2010/0291965 A1 | 11/2010 | Tabe |
| 2011/0012794 A1 | 1/2011 | Schlub |
| 2011/0036912 A1 | 2/2011 | Guo et al. |
| 2011/0109515 A1 | 5/2011 | Rao |
| 2011/0140982 A1 | 6/2011 | Ozden et al. |
| 2012/0044115 A1 | 2/2012 | McCaughey et al. |
| 2012/0074231 A1 | 3/2012 | Jain et al. |
| 2012/0242549 A1 | 9/2012 | Wong et al. |
| 2012/0309472 A1 | 12/2012 | Wong et al. |
| 2013/0109435 A1 | 5/2013 | McCaughey et al. |
| 2013/0252677 A1 | 9/2013 | Wong et al. |
| 2013/0286582 A1 | 10/2013 | Dabov et al. |
| 2014/0057686 A1 | 2/2014 | McCaughey et al. |
| 2014/0287697 A1 | 9/2014 | Wong et al. |
| 2015/0048979 A1 * | 2/2015 | Asrani et al. ............... 343/702 |

FOREIGN PATENT DOCUMENTS

| | | |
|---|---|---|
| EP | 1 292 042 A2 | 3/2003 |
| EP | 1 835 562 A1 | 9/2007 |
| EP | 1 942 580 A2 | 7/2008 |
| WO | WO 00/13330 | 3/2000 |
| WO | WO 01/35487 A1 | 5/2001 |
| WO | WO 02/095867 A1 | 11/2002 |
| WO | WO 03/028424 A1 | 4/2003 |

OTHER PUBLICATIONS

Final Office Action for U.S. Appl. No. 12/614,132, mailed Mar. 1, 2012.
Office Action for U.S. Appl. No. 12/724,290, mailed Nov. 9, 2011.
Office Action for U.S. Appl. No. 13/287,680, mailed Apr. 2, 2014.
Office Action for U.S. Appl. No. 13/491,747, mailed Sep. 7, 2012.
Office Action for U.S. Appl. No. 13/492,518, mailed Mar. 21, 2014.
Office Action for U.S. Appl. No. 13/894,039, mailed Jul. 25, 2013.
Office Action for U.S. Appl. No. 13/894,039, mailed Jan. 13, 2014.
Office Action for U.S. Appl. No. 14/071,197, mailed Mar. 20, 2014.
Final Office Action for U.S. Appl. No. 14/071,197, mailed Aug. 18, 2014.
International Search Report and Written Opinion for International Application No. PCT/US2009/063618, mailed Mar. 1, 2010.
Patent Examination Report No. 1 for Australian Application No. 2009313338, mailed Mar. 6, 2013.
Patent Examination Report No. 2 for Australian Application No. 2009313338, mailed Mar. 11, 2014.
First Office Action for Chinese Application No. 200910221262.X, issued May 3, 2013.
Second Office Action for Chinese Application No. 200910221262.X, issued Nov. 22, 2013.
Third Office Action for Chinese Application No. 200910221262.X, mailed Mar. 27, 2014.
Fourth Office Action for Chinese Application No. 200910221262.X, mailed Oct. 17, 2014.
International Search Report and Written Opinion for International Application No. PCT/US2012/062995, mailed Mar. 8, 2013.
Extended Search Report for European Application No. 12846415.3, mailed May 15, 2015.
"Defender Series for Nokia E72 Protection that Works" Dec. 31, 2010, Retrieved from the Internet: <URL: http://www.techbuy.com.au/images/addi/13/File1315854598.pdf> [retrieved on May 7, 2015], 1 page & "Otterbox Nokia E71 E71x Defender Series Case—Original (OEM) NOK2-371XX-20-C50TR_A," Dec. 31, 2010, Retrieved from the Internet: <URL:https://www.youtube.com/watch?v=tDrVce-jaGY] [retrieved on May 7, 2015].
First Office Action for Chinese Application No. 201280064893.5, mailed Jun. 3, 2015.

* cited by examiner

EXTERNAL CASE FOR REDISTRIBUTION OF RF RADIATION AWAY FROM WIRELESS COMMUNICATION DEVICE USER AND WIRELESS COMMUNICATION DEVICE INCORPORATING RF RADIATION REDISTRIBUTION ELEMENTS

CROSS REFERENCE TO RELATED APPLICATIONS AND CLAIM FOR PRIORITY

This application is a continuation of U.S. patent application Ser. No. 13/287,680, entitled "External Case for Redistribution of RF Radiation Away From Wireless Communication Device User and Wireless Communication Device Incorporating RF Radiation Redistribution Elements," filed on Nov. 2, 2011 (now U.S. Pat. No. 8,957,813), which is a Continuation-in-part of U.S. patent application Ser. No. 12/724,290, entitled "RF Radiation Redirection Away From Portable Communication Device User," filed on Mar. 15, 2010 (now U.S. Pat. No. 8,214,003), which claims priority to and the benefit of Provisional Application No. 61/160,282, filed Mar. 13, 2009, all of which are incorporated herein by reference in their entirety.

U.S. patent application Ser. No. 12/724,290 is also a continuation-in-part of U.S. patent application Ser. No. 12/614,132, entitled "Radiation Redirecting External Case For Portable Communication Device And Antenna Embedded In Battery Of Portable Communication Device," filed Nov. 6, 2009 (now U.S. Pat. No. 8,208,980), which claims priority to and the benefit of U.S. Provisional Application No. 61/112,141, filed Nov. 6, 2008 and U.S. Provisional Application No. 61/158,551, filed Mar. 9, 2009, all of which are incorporated herein by reference in their entirety.

BACKGROUND OF THE INVENTION

1. Field of the Invention

This invention relates generally to portable communication devices such as cell phones, smart phones, and similar handheld devices such as tablet computers or tablets, and improvements thereto. In particular, this invention provides improvements in antennas and radio frequency ("RF") shielding of such devices, by redirecting their RF radiation away from the body of a user while simultaneously maintaining the total radiated power ("TRP") of such devices.

2. Background

Design requirements of mobile devices such as tablets, cellular phones, and smart phones place an ever increasing premium on the available space within these devices as their functions become more diverse. A device might function not only as a wireless telephone, but also as a music and video player; handheld computer; wireless device for browsing the web, retrieving email, and downloading or uploading files; still and video camera; GPS device and navigation system, and so forth. These functions and their related hardware bring with them greatly increased demands upon the antenna and generally require more radiated power for transmission, which might serve up to five frequency bands and, again, leave less space than ever before available for the antenna.

At the same time, although RF radiation has a necessary and beneficial role in wireless communications, its potential risk to human health have become a matter of concern. Cell phone antennae emit microwave energy (a type of RF radiation) when transmitting to cell towers. Consumers' heads and bodies absorb the majority of this energy, while the devices are proximate to them. The most intense radiation comes from RF waves nearest to the antenna, the radiation's source.

In free space, this more intense "near field" energy would "propagate" to become far field energy, the form of RF signal that communicates with the tower. Mobile devices, including tablet computers, include manufacturers' warnings to keep the devices away from the head and body in order to avoid exposure to near field energy. Addressing this issue in the design of the antennae, and within the physical space constraints of mobile devices themselves, poses a particularly difficult technical challenge.

The Federal Communications Commission ("FCC") limits the amount of radiation that portable communication devices (such as tablets and cellular telephones) may emit, as measured on the Specific Absorption Rate or "SAR" scale, in light of human health and safety concerns. Yet, as noted above, as wireless communications technology advances, devices have incorporated more data-intensive functions that require increasingly higher rates of data transfer between cell towers and the devices. While the functionality of mobile devices might, therefore, benefit from being able to increase the power output of their antennae, FCC regulations would not allow the resultant SAR increase.

In terms of its actual architecture, a "smart phone" (the catch-all nomenclature for devices like the iPhone and BlackBerry), for example, typically incorporates one or more internal antennae located at both the lower and upper parts of the phone and bordering the display area. The space for each antenna is usually limited to 1 cm times the width and thickness of the phone. The antenna is situated close to the back surface of the phone, on the side opposite to the user.

Tablet devices like the iPad have a larger surface area than a smart phone. The tablet can be configured as a Wi-Fi (WLAN) only device, and also as a Wi-Fi plus 3G mobile telephony capable device. Separate internal antennae would be provided for each type of wireless connectivity. The antennae are situated toward the back surface of the tablet, typically along a peripheral edge. Tablet models having 3G or other mobile telephony capability may have an elongated strip of plastic on the body above the location of the 3G or other telephony protocol antenna, to allow the mobile telephony signal to reach the internal antenna.

Some 3G-capable tablet computers include capacitive proximity sensors attached to the plastic strip, such that when the user's hand or body is in contact with the device at the location of the antenna, the TRP of the device is lowered in order to reduce the SAR experienced by the user. Lower TRP, however, reduces the quality of 3 G communication. Conventional external cases for such 3G-enabled tablet devices also cover and come into contact with the plastic strip having the attached proximity sensor, which may similarly result in reduced quality 3 G communications.

SUMMARY OF THE INVENTION

According to a first embodiment, the antenna inside a wireless phone couples inductively to a location outside the device, where the distribution of radiation can be better managed. It presents several methods of directing RF radiation away from the user's head and body by the appropriate placement of metallic loops, directors, and other parasitic elements. This methodology can take the form of arrays of monopole and dipole antennas, conducting loops and conducting plates with insulators or dielectrics. The general concept is to couple the radiation from the internal antenna on the side facing the user to the opposite side of the device, in order to re-direct such radiation outward away from the user and make it less concentrated.

According to a second embodiment, an external case is provided for a tablet computer or tablet having mobile telephony capability. The external case redistributes RF radiation over the relatively large back surface area of the device. The external case is designed in such a way that it does not cover (and so does not trigger) any proximity sensor that may be attached to a mobile telephony antenna cover on the body of the tablet. As a result, the inventive external case provides a significant reduction in SAR to the user, while preserving (and in some instances actually increasing) the TRP of the tablet, thus maintaining a high quality communication signal.

DETAILED DESCRIPTION OF THE INVENTION

In one preferred embodiment of the invention, external coupling antennae are provided to couple radiation from the internal antenna of a wireless device and to redirect the radiation such that there is minimum radiation towards the user and maximum radiation away from the user. It is important to note that this coupling method does not require an actual physical connection between the external coupling antennas and the antenna internal to the phone. However the position of the coupling antenna with respect to the internal antenna is critical. Through a series of coupling loops, directing elements or patch antennas located on a cover or case, a "clip" structure, or directly on an external surface of the mobile device, the near-field radiation is further directed away from the user's head and body (which are absorptive) to the far-field environment for communication to cell towers.

The materials used for coupling and re-directional elements are generally made out of materials of high electrical conductivity. Dielectric materials are used, as well, to achieve optimal physical sizes and spacing of various elements.

The above methodology is illustrated by the treatment of two exemplary wireless devices—the Apple 3G iPhone and the RIM Blackberry Curve 8300. However, the procedure is perfectly general and can be applied to any wireless device using different combinations of the elements described.

Figure 1:
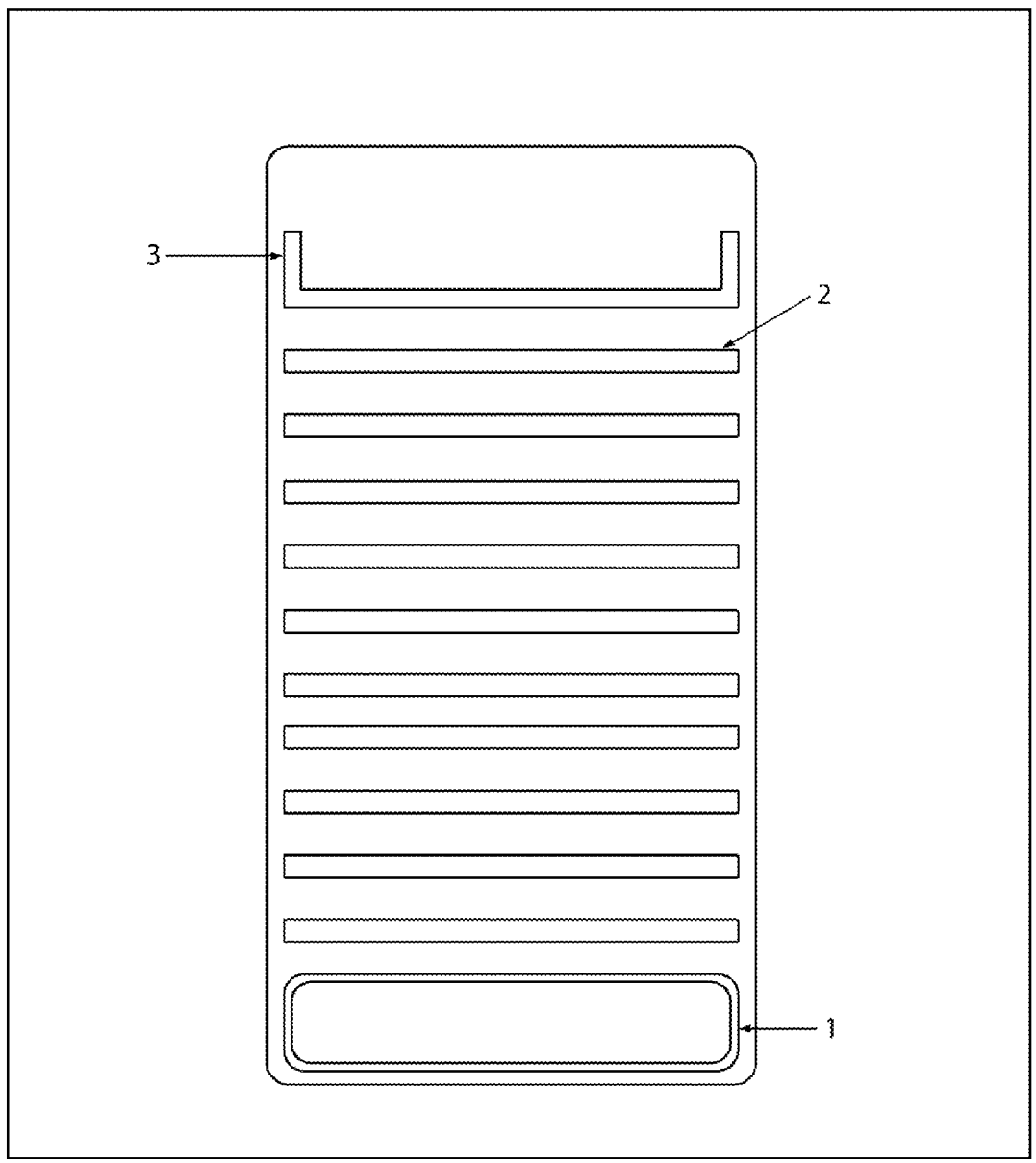
FIG. 1 shows RF coupling elements mounted on the back of a mobile telephone.
Figure 2:
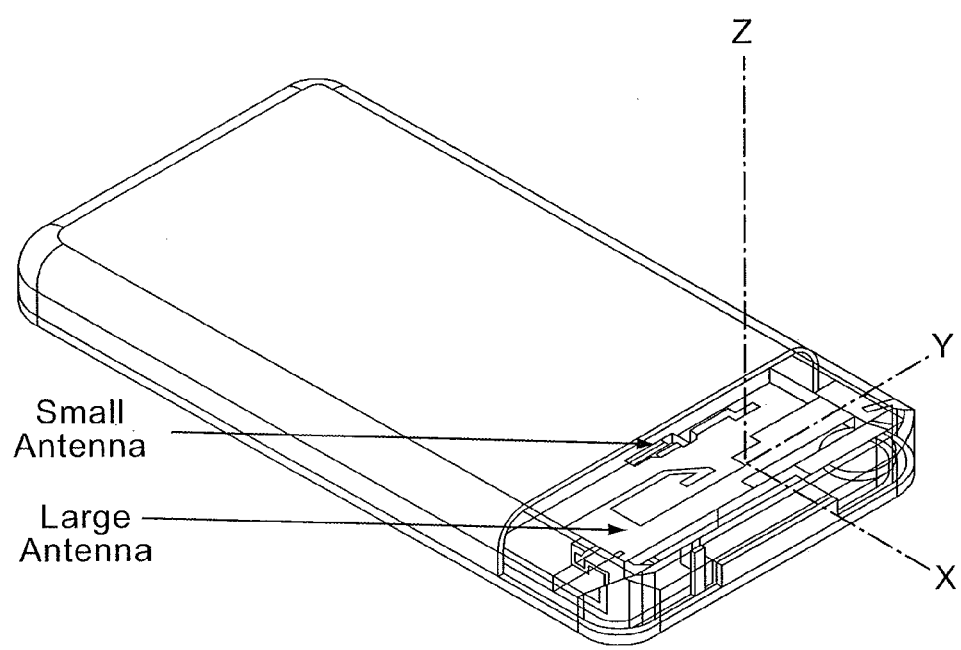
FIG. 2 shows a perspective view of a mobile telephone with placement of small and large antennas.

Referring to FIG. 1, the radiation from an internal antenna (not shown) is directed away from the user and outward at the back of the phone through a coupling loop 1 mounted on the back of the phone. The coupling is achieved through electromagnetic ("EM") induction as revealed by laboratory experiments and computer modeling of various physical quantities (antennae, connectors, circuit elements, ground planes, etc.) inside a mobile communication device such as an Apple iPhone, as illustrated in FIG. 2. The EM fields are then successively coupled up a "ladder" of metallic strips 2 up the backside of the iPhone enclosed inside the case. The placement of the coupling loop 1 with respect to the antenna inside the mobile device is critical. As shown, the horizontal metallic strips may be straight, or may have regular or irregular shapes such as "U" shaped metallic element 3, whose dimensions are adjusted to fit the available space on the back of the phone, while achieving optimal coupling from the loop 1.

Figure 3:
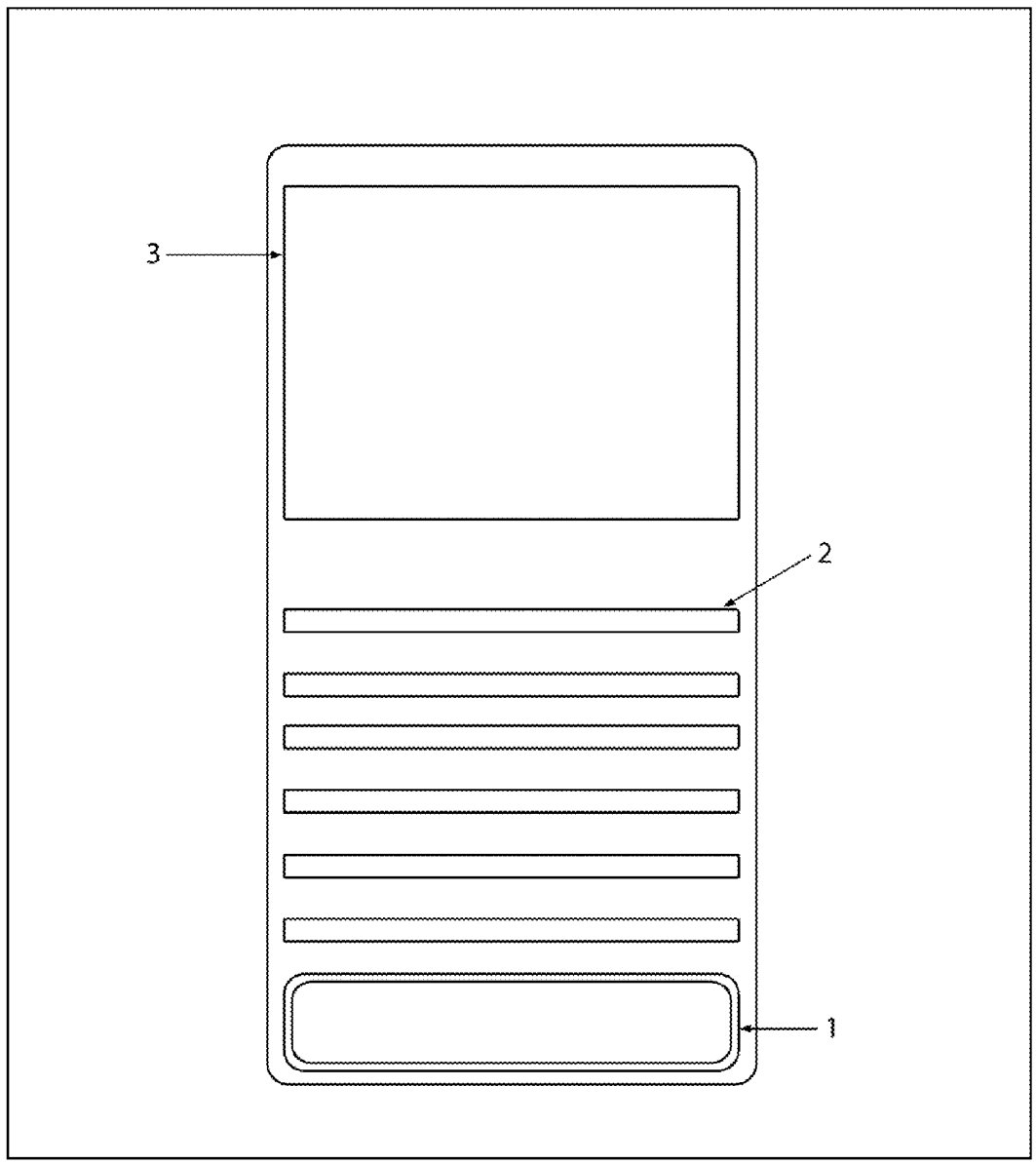
FIG. 3 shows an RF loop over an internal antenna of a mobile telephone.

One variation of the above design is in the replacement of an uppermost radiation re-director by a single plate 3 as illustrated in FIG. 3. The use of a plate resembles a patch antenna whose radiation pattern favors the outward direction away from the user. The loop 1 couples power out from the internal antenna, then the directors 2 couple the power up to the plate 3, from which the radiation is directed outward from the phone in the direction opposite to the user's head.

Figure 4:
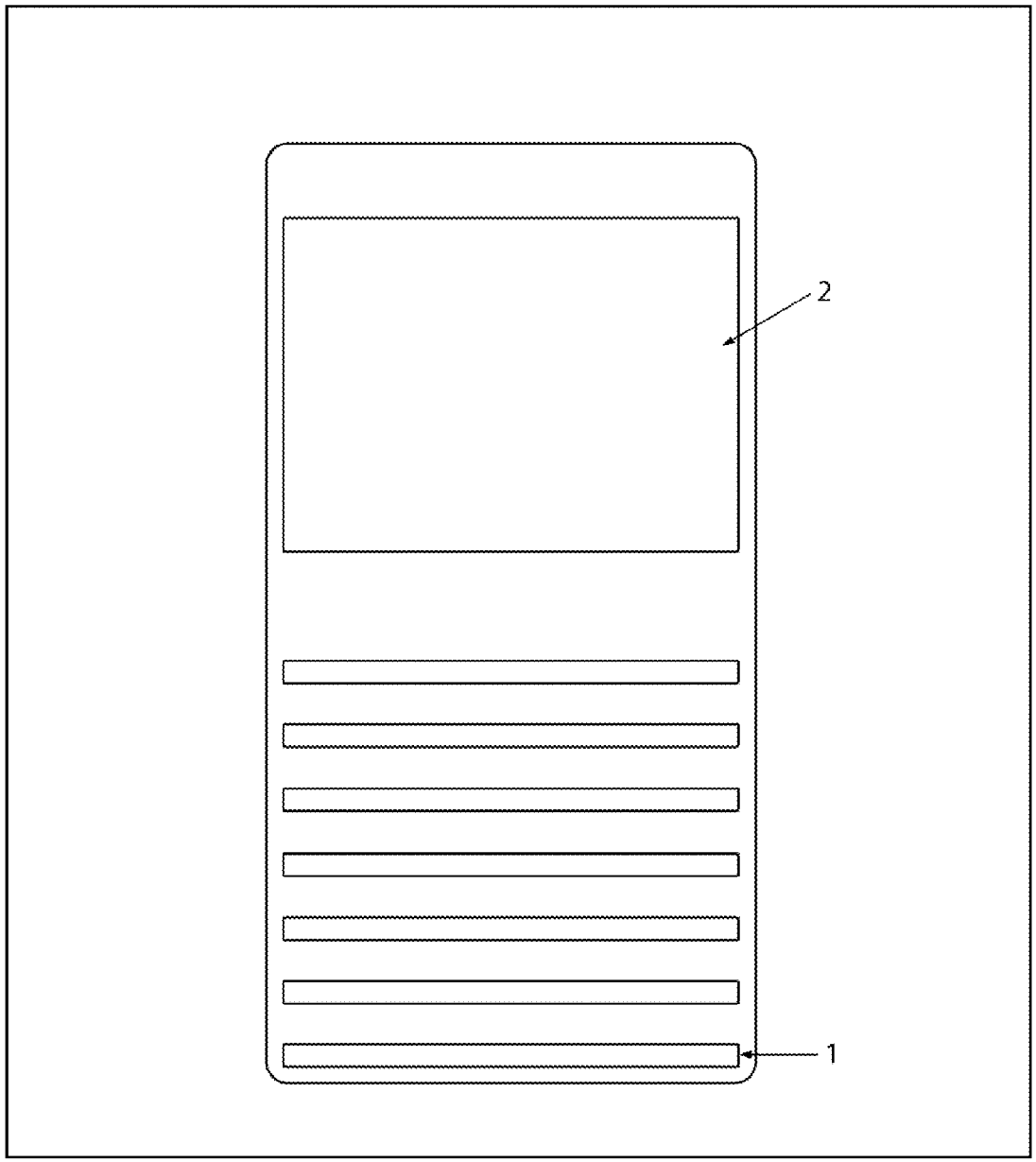
FIG. 4 shows an RF coupling parasitic device mounted on the back of a mobile telephone.
Figure 5:
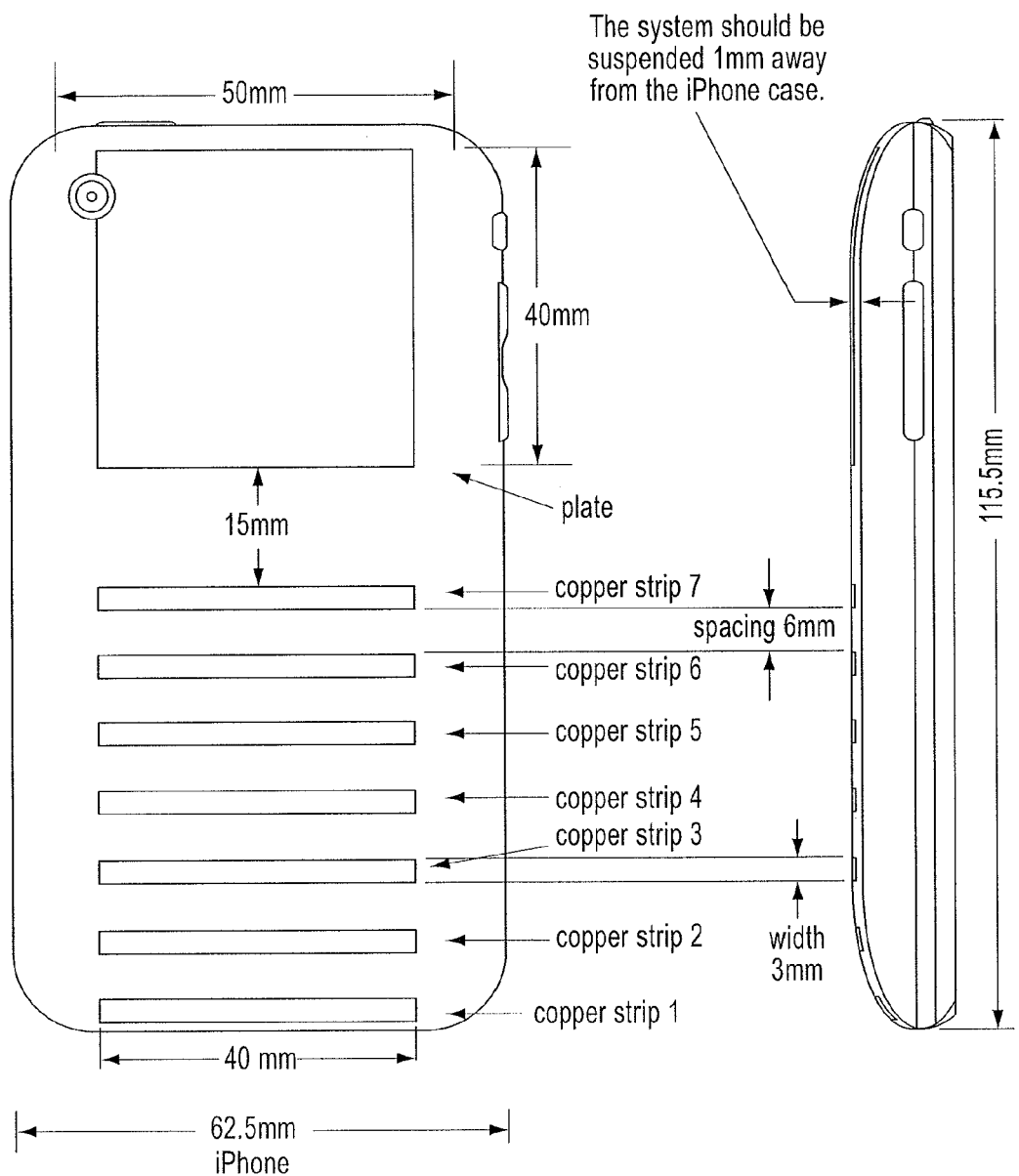
FIG. 5 shows a front and side view of a "ladder and plate" RF coupling design for a mobile telephone.

Another variation, illustrated in FIG. 4, as well as in FIG. 5, which depicts an application of this design to the Apple iPhone 3G, is the replacement of the coupling loop by an RF coupling parasitic redirector composed of horizontal strips 1 that form a ladder-like array leading to a rectangular plate 2 above the ladder. All these configurations have been tested and shown to significantly reduce the amount of radiation directed towards a user while maintaining or even enhancing the total radiation power of the cell phone.

Figure 6:
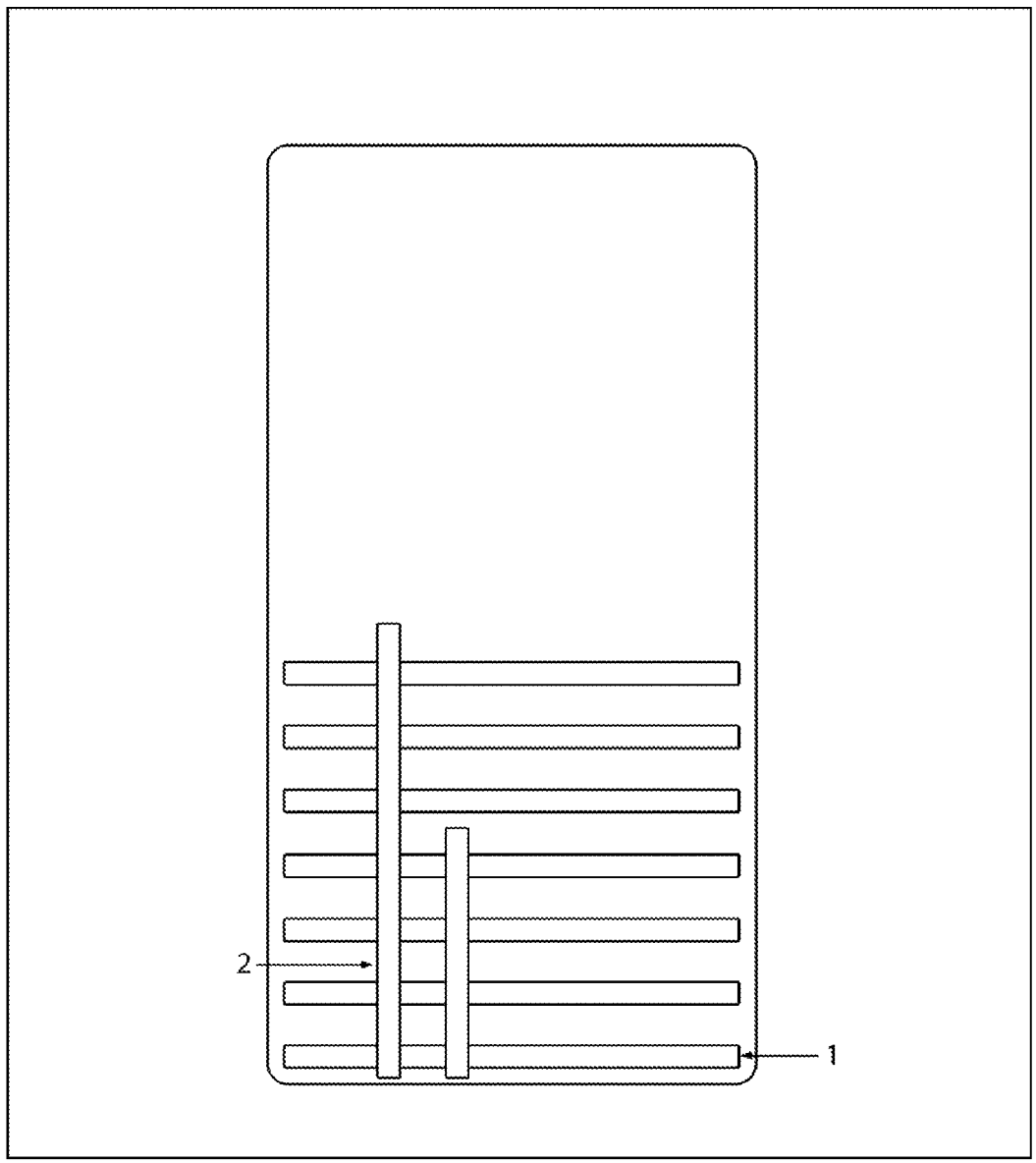
FIG. 6 shows an alternate embodiment of an RC coupling parasitic device mounted on the back of a mobile telephone.

A further embodiment is the use of vertical strips 2 that are orthogonal to the horizontal strips 1, as shown in FIG. 6. These vertical strips couple to a vertical polarization of the radiation from the internal cell phone antenna. The purpose is to couple to both polarizations to fully redirect the maximum amount of RF radiation from the cell phone antenna away from the direction of the user. The vertical strips 2 are placed in a layer above the horizontal strips such that they provide additional coupling with any corresponding vertical elements of the internal antenna.

Figure 7:
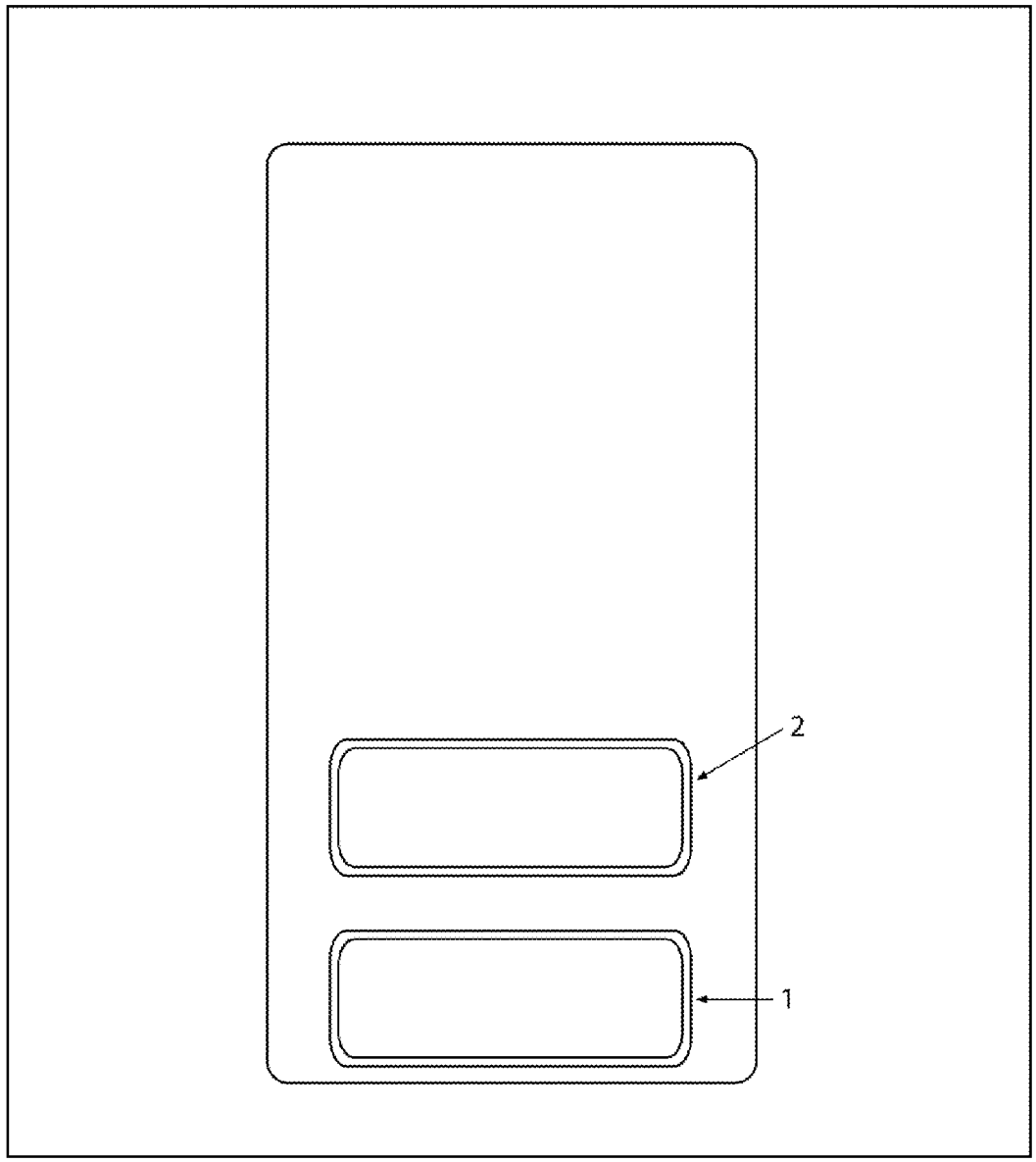
FIG. 7 shows a pair of RF coupling devices in the form of first and second loops mounted on the back of a mobile telephone.
Figure 8:
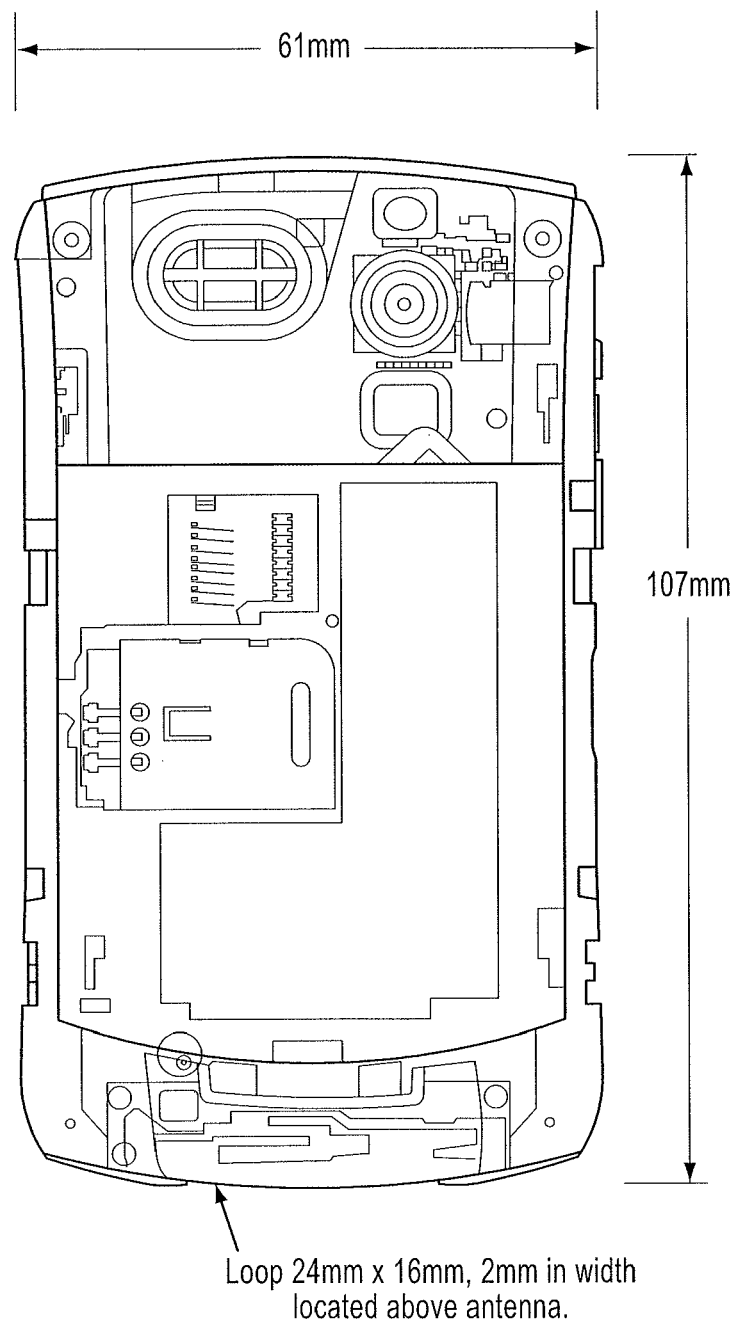
FIG. 8 shows a partial phantom view of an RF coupling loop design where the loop is mounted above the internal antenna of a mobile telephone.

For some wireless communication devices, such as the Blackberry 8300 shown in FIG. 8, the internal components of the phone require a simpler approach as illustrated in FIG. 7, where a single loop 1 is placed over the location of the internal antenna, and may be augmented by a second loop 2 above the first loop 1. The first loop 1 couples the RF field from the internal antenna, and the second loop 2 provides additional redirected radiation away from the user. Size and spacing are tuned to the particular phone. For the Blackberry 8300, a loop of 24 mm×16 mm×2 mm is placed such that it wraps under the bottom of the phone by 2 mm as shown in FIG. 8. This configuration produces ideal results as verified by independent laboratory testing by Cetecom in Milpitas, Calif.

Figure 9:
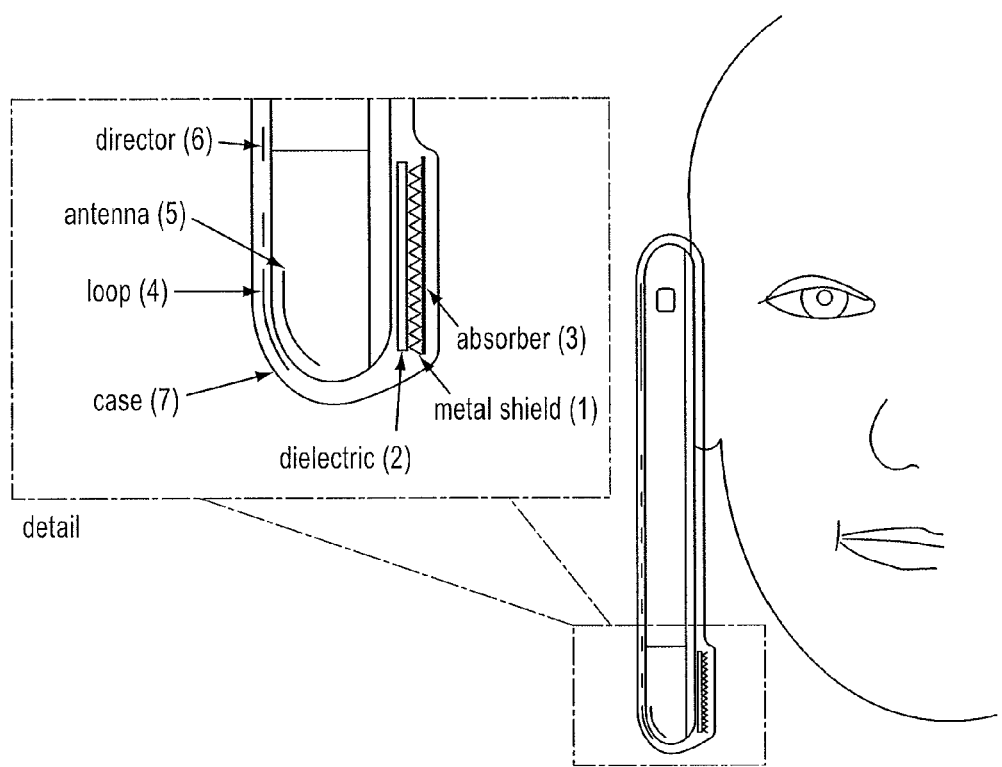
FIG. 9 shows a mobile telephone external case design including a reflective shield at the front side of the device and a radiation coupling device at the rear side of the device.
Figure 10:
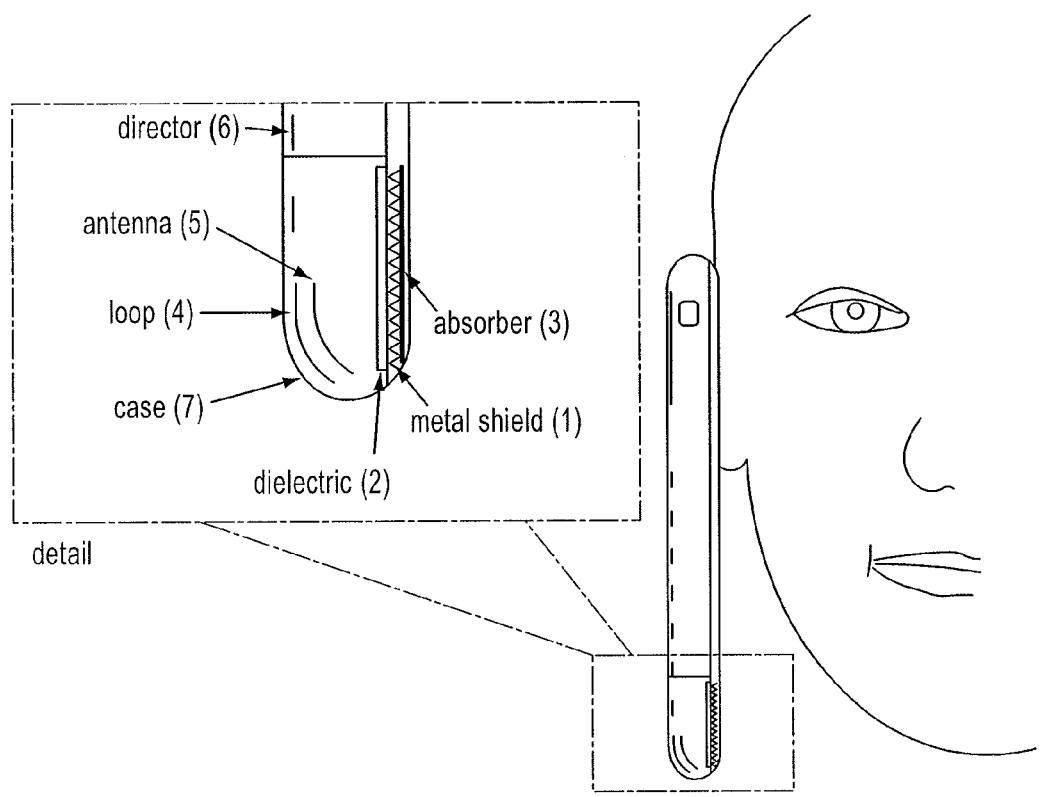
FIG. 10 shows an alternate embodiment of FIG. 9 wherein an RF redirection system is integrated into the internal design of a wireless device.

In another embodiment of the invention shown in FIGS. 9 and 10, a shield comprising a corrugated metallic surface is provided, either incorporated into a protective case (FIG. 9), or integrated directly into the body of the mobile communication device itself (FIG. 10). The metallic shield is located on the user side of the phone directly in front of the internal antenna. Such a shield also may be installed inside the cell phone. Such a corrugated surface gives rise to many image dipoles, thereby providing a wide pattern of scattered radiation. The particular shape and size of corrugations are designed to scatter radiation, which normally would be incident upon the user, in directions away from the user as widely as possible. In scientific terms the scattering angles from the incident wave vector could range from +/−40 to +/−180°.

The corrugations generally should have sizes smaller than wavelengths of microwave frequencies transmitted from the wireless device. They therefore introduce scattering wave vectors that are greater than the incident wave vector in directions perpendicular to the incident wave vector. The purpose of the design of the corrugations is to deflect the radiation away from the user and at the same time avoid creating reflections back on the internal radiating antenna; as a result the impedance seen by the output amplifier of the wireless device—e.g., the cell phone—is not affected and the total radiated power of the phone is not reduced, while SAR is significantly reduced.

In this embodiment, the loop 4 and the directors 6 are positioned relative to the internal antenna 5 such that the loop is close to the antenna and couples the RF power out from the back of the phone and up to the directors 6.

As shown in FIG. 9, in a case 7, a layer of highly conductive corrugated metal shield material 1 is, optionally, combined with a layer of absorptive material 3 of a specific frequency range, placed on the side of the metallic shield opposite to the internal antenna, such that with the phone inserted into the external case the shield is positioned between the user's head and the internal antenna. The absorber 3 prevents any radiation that passed through the shield from reaching the user. Also, a layer of dielectric material 2 may be added between the internal antenna and the shield to reduce the spacing required to achieve an effective distance between the antenna and the shield of ¼ wavelength of the RF radiation.

The redirection of RF radiation away from the user's head also may be achieved by the use of a properly located passive RF coupling redirector 4-6 as shown in FIG. 9, in combination with the corrugated shield of highly conductive metallic material 1. An alternate embodiment as shown in FIG. 10 may have the RF redirector 4-6 and metallic shield 1 integrated within the wireless communication device itself.

A main feature of this invention, both as a passive directional beam antenna alone, or in combination with a passive re-directional shield, incorporated in an external case for a wireless phone, or such combination incorporated internally in a wireless phone device, is that the invention directs/redirects radiation away from the user, out of the phone, reducing SAR (Specific Absorption Rate), without adversely affecting TRP. It does this with a directional antenna, or a combination of a directional antenna and re-directive shield, or with a re-directive shield only, integrated within a case of non-conducting or low-conductive materials (variously of silicone, plastic, cloth, etc.) that allow EM waves to propagate outward toward the cell phone tower without suffering any attenuation.

Figure 11:
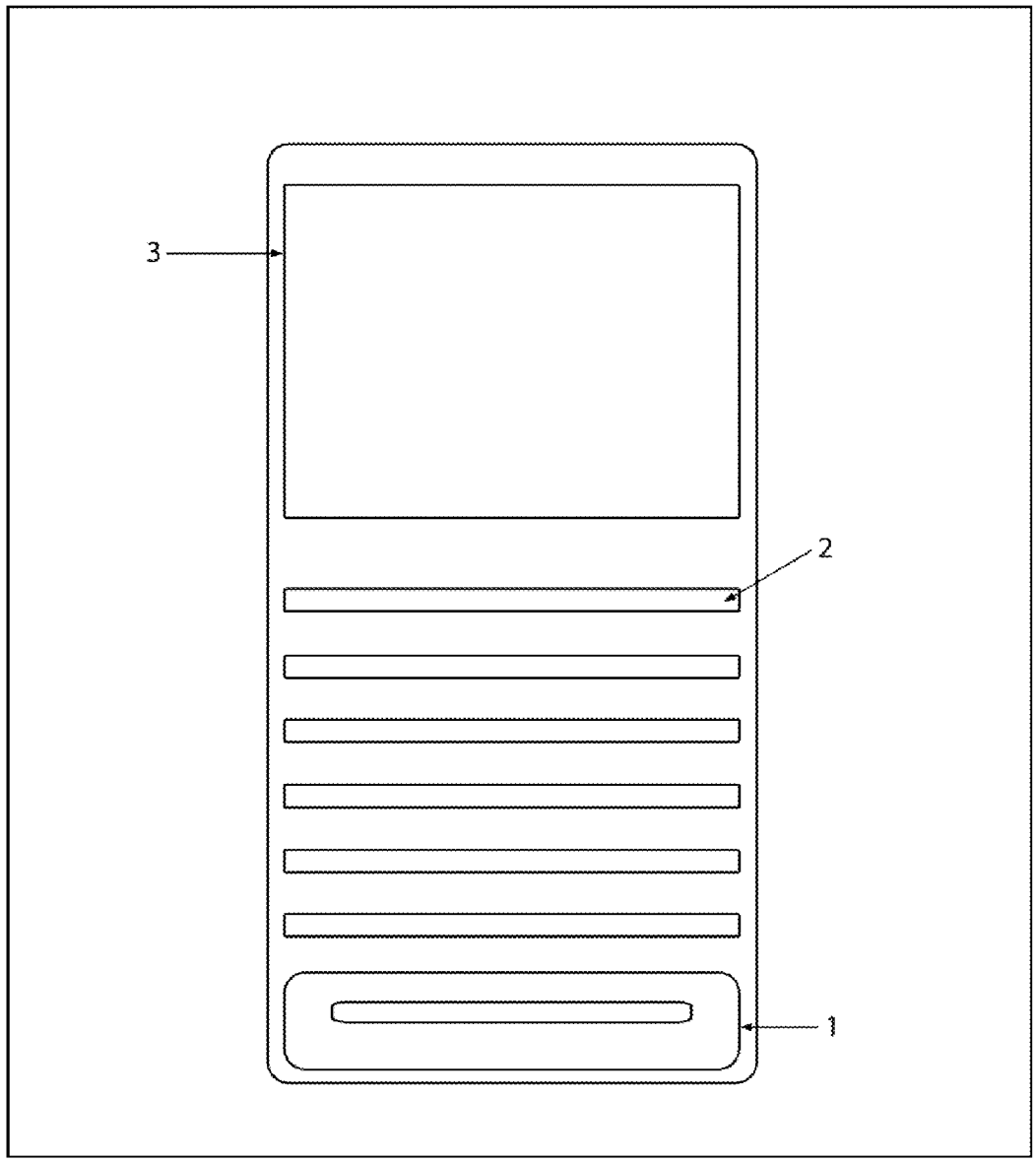
FIG. 11 shows an alternate embodiment of an RF loop design mounted on the back of a mobile telephone device.

A further alternate embodiment of the RF coupling radiation redirector is shown in FIG. 11. Here, a loop 1 consists of a metallic sheet with a narrow slot having a length and width tuned to ¼ of the wavelength of the transmitting RF radiation. For example, a 1900 MHz transmission would correspond to a 40 mm slot length.

Figure 12:
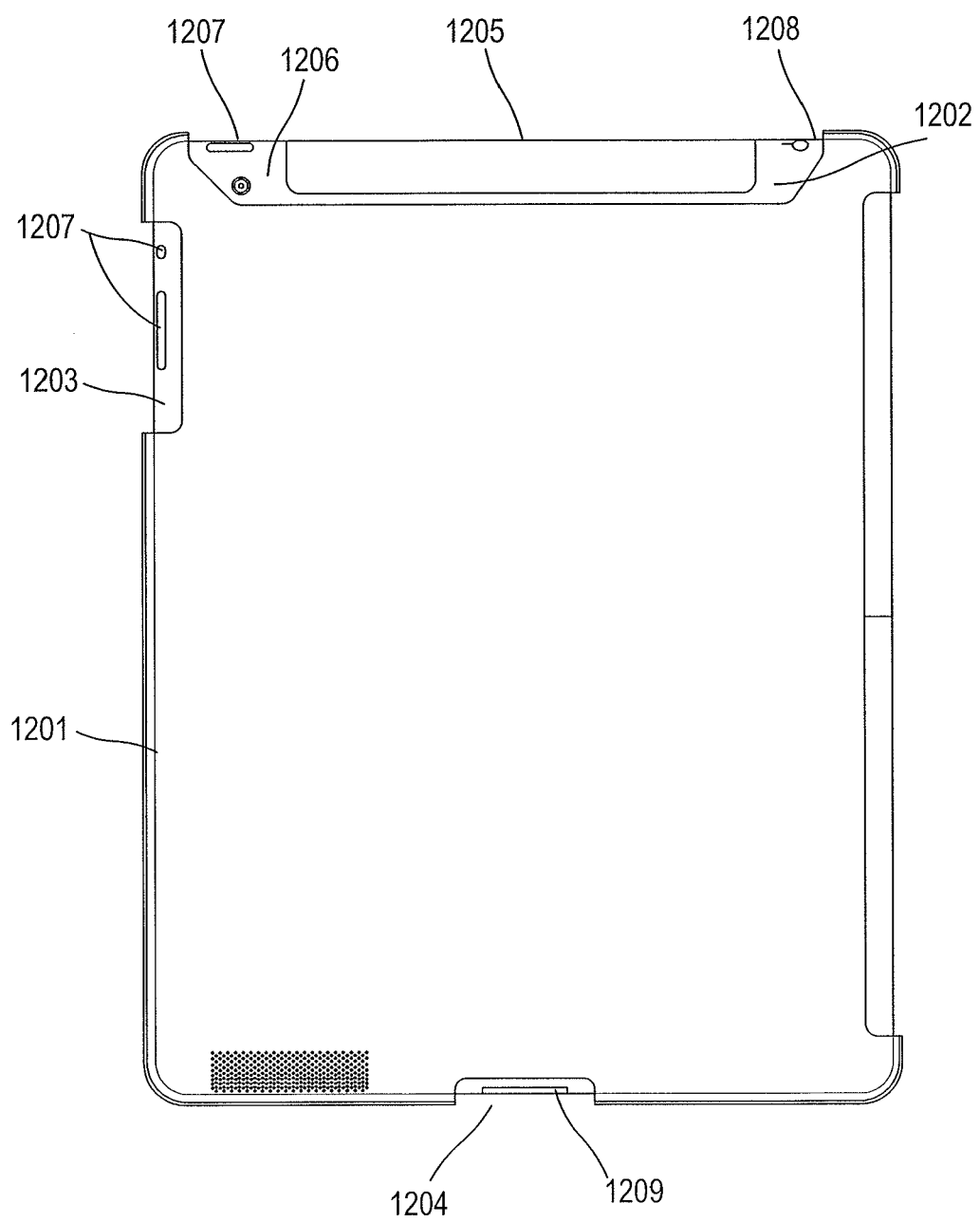
FIG. 12 shows a tablet computer external case design according to one embodiment of the present invention.

FIG. 12 shows one embodiment of an external case 1201 for a tablet computer, such as the iPad. The case 1201 is preferably made of a sturdy material such as polycarbonate. The case 1201 contains a number of cut-out sections 1202, 1203 and 1204, to allow access to a video camera 1206, various switches 1207, headphone jack 1208, and input/power interface 1209. Most importantly, the cut-out section 1202 leaves plastic strip 1205 exposed. As discussed above, the plastic strip 1205 is provided on tablet computers having 3G or other mobile telephony capability. This plastic strip 1205 is located over an internal 3G or other mobile telephony antenna, and is provided so as to enable mobile telephony signals to reach the internal antenna and to enable transmission signals to leave the device.

In conjunction with it being located over an internal mobile telephony antenna, a capacitive proximity sensor (not shown) may be attached to the plastic strip 1205. When a user's body part such as a hand contacts the strip 1205, the proximity sensor is activated, causing the TRP of the device to be reduced. The purpose of the reduction in TRP is to lower the SAR experienced by the user when using the device in mobile telephony applications. However as explained above, the reduced TRP reduces the RF signal transmission power, and consequently degrades communication quality. Prior art external cases also covered the mobile antenna strip cover 1205, thereby causing a constant reduction in transmission signal quality whenever the external case is used with the device.

In accordance with the present invention, the case 1201 contains a cut-out section 1202 in the location of the strip 1205 covering the internal mobile antenna. In this way, use of the external case 1201 does not interfere with the TRP produced by the tablet during mobile telephony applications (such as telephone calls, Internet applications, video conferencing, etc.).

Figure 13:
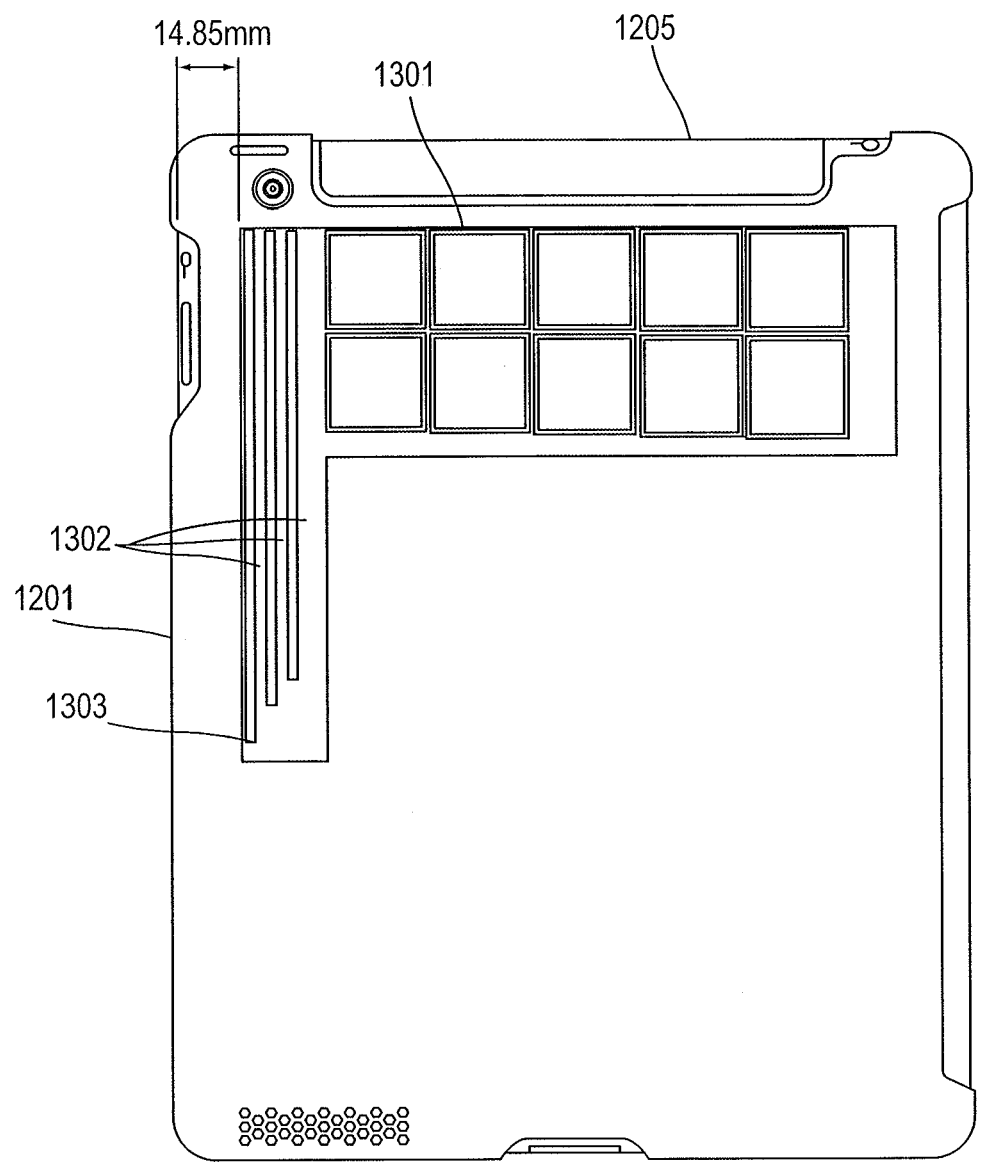
FIG. 13 shows details of RF radiation redistribution elements embedded in the external case of FIG. 12 in accordance with one embodiment of the present invention.
Figure 14:
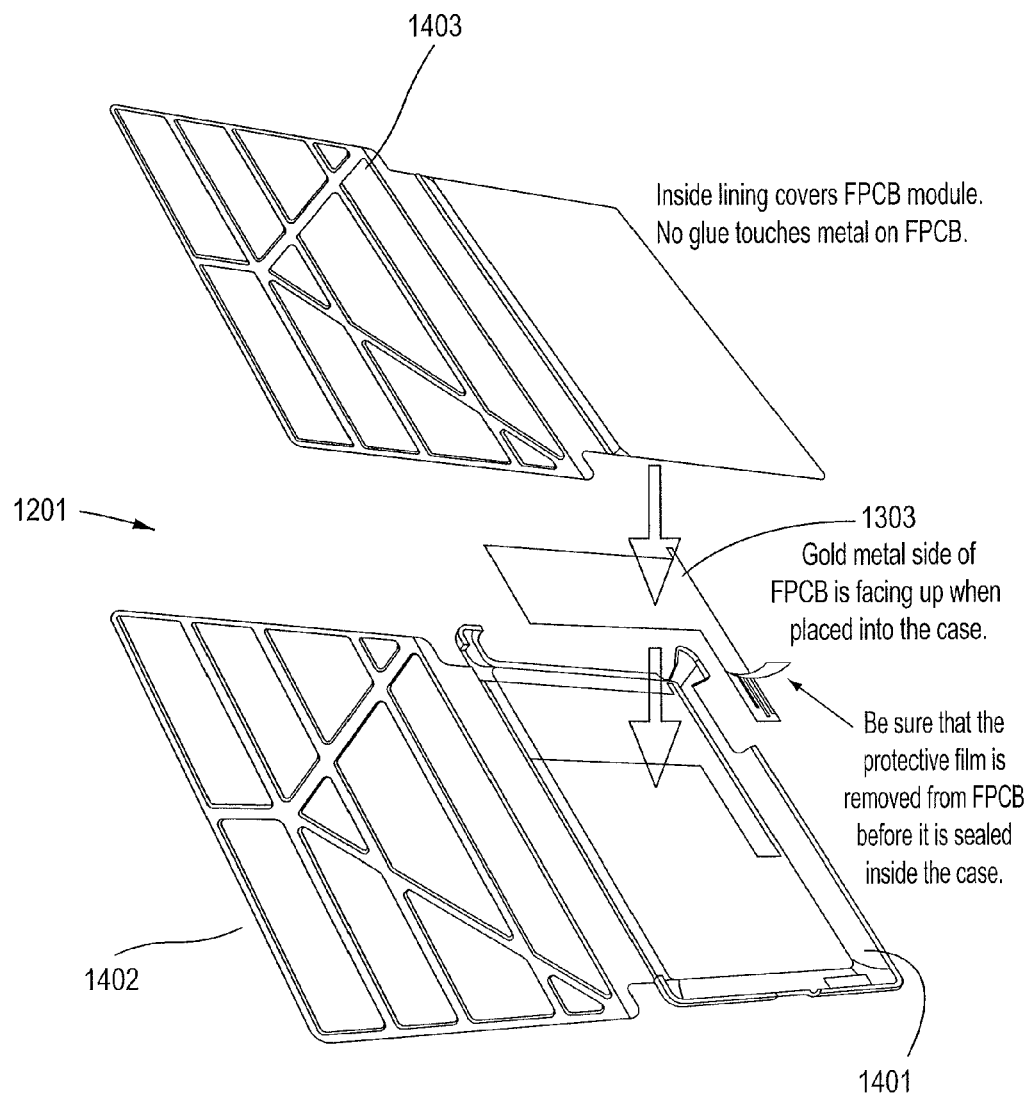
FIG. 14 is an exploded view of various component parts of an external case for a tablet computer in accordance with one embodiment of the present invention.

As shown in FIG. 13, a number of RF radiation redistribution components are embedded in the external case 1201. The radiation redistribution components may be in the form of resonant loops 1301 and radiation directors 1302. A Flexible Printed Circuit Board (FPCB) 1303 as shown in FIGS. 13 and 14 is embedded in a polycarbonate shell 1401 (FIG. 14), that holds the FPCB 1303 on the back of the tablet.

The resonant loops 1301 are preferably made of 1 oz copper elements upon a 2 mil thick polyimide substrate (the resonant loops are typically rectangular or square in shape, but may be formed in any desired shape). The loops 1301 have perimeters which equal approximately 1 wavelength of the emitted RF transmission wave as it travels through the polycarbonate material, i.e., the loops are resonant with the RF transmission. Loop size is dependent on the frequency of the mobile or cellular telephony transmission and the dielectric constant of the material in which the FPCB is embedded. There are often multiple loops of varying size to resonate with the different bandwidths and frequencies of cellular telephony transmission. These loops couple inductively (i.e., passively) with the internal mobile or cellular telephony antenna.

Typically the FPCB 1301 would be located approximately 1 mm from the back surface of the tablet. The result is to create a new effective antenna structure which is a combination of the internal antenna and the FPCB case-embedded antenna formed by the resonant loops and directors. This new effective antenna has a much more directional radiation pattern than the internal antenna by itself (which has a substantially 360° radiation pattern). Because the effective antenna formed by the combination of the internal antenna and the case-embedded components has more radiative components located at the back of the device, the amount of radiation that was previously directed towards the user from the front of the device is substantially reduced.

However, since only the shape of the radiation pattern (and not its overall power) has changed, the device still emits substantially the same TRP (within a tolerance of +/−2.5 dB) so that there is no loss in communication ability or quality.

The FPCB may also contain directors 1302—copper strips which have lengths equal to approximately ½ wavelength (or multiples thereof) of the RF waves emitted from the internal antenna. These directors provide a structure that spreads the coupled RF radiation from the internal antenna over a larger area. The combination of resonant loops 1301 and directors 1302 provide a larger surface area for cellular telephony emission, thereby reducing local intensity, while still maintaining the same total power (TRP).

It is noted that the aim of the tablet external case is not to change the directionality of the antenna emissions, but to redistribute or spread the RF radiation over a larger area through a combination of resonant conductive loops and director elements inductively coupled to the internal RF antenna of the tablet device. The effect of such radiation redistribution is that local radiation intensity is significantly reduced.

FIG. 14 illustrates an exploded view of the external case components. The case 1201 is formed of an external shell 1401, a cover 1402 and an inside lining 1403. A FPCB 1303 fits into the shell 1401 and is covered by the lining 1403.

It will be further noted that the resonant loops 1301 and elongated directors 1302 may be incorporated directly with the tablet device itself, either internally or externally, without the use of an external case. Such embodiments are also contemplated within the scope of the present invention.

What is claimed is:

1. An apparatus, comprising:
a wireless communication device having a housing, an internal antenna and a coupling antenna, the housing having a first side and a second side opposite the first side, the internal antenna and the coupling antenna being operatively coupled when the wireless device is operational,
the first side of the housing having a first portion and a second portion mutually exclusive from the first portion of the first side of the housing, the first portion of the first side of the housing having a material different from a material of the second portion of the first side of the housing,
the internal antenna being disposed between the first portion of the first side of the housing and the second side of the housing, an interior of the housing being disposed between the coupling antenna and the second side of the housing.

2. The apparatus of claim 1, wherein the coupling antenna is disposed between the second portion of the first side of the housing and the second side of the housing.

3. The apparatus of claim 1, wherein the coupling antenna is disposed within the second portion of the first side of the housing.

4. The apparatus of claim 1, wherein the second portion of the first side of the housing is disposed between the coupling antenna and the second side of the housing.

5. The apparatus of claim 1, wherein the coupling antenna is formed on a flexible printed circuit board (FPCB).

6. The apparatus of claim 1, wherein the coupling antenna is disposed on a side of the housing, the side of the housing being disposed between the coupling antenna and the internal antenna.

7. The apparatus of claim 1, wherein the coupling antenna is disposed on a side of the housing, the coupling antenna being disposed between the side of the housing and the internal antenna.

8. An apparatus, comprising:
an external case configured to be coupled to a wireless device having a housing separate from the external case,
the external case having an antenna that operatively couples to an antenna of the wireless device when the external case is coupled to the wireless device and the wireless device is operational,
the external case having a shape that covers a first portion of a side of the wireless device and exposes a second portion of the side of the wireless device mutually exclusive from the first portion of the wireless device, the second portion of the wireless device associated with a location of the antenna of the wireless device.

9. The apparatus of claim 8, wherein the external case having the shape such that the second portion of the side of the wireless device is exposed and overlays at least a portion of the antenna of the wireless device.

10. The apparatus of claim 8, wherein:
the side of the wireless device is a first side of the wireless device,
the external case having the shape such that (1) the second portion of the first side of the wireless device is exposed and (2) the antenna of the wireless device is disposed between the second portion of the first side of the wireless device and a second side of the wireless device opposite the first side of the wireless device.

11. The apparatus of claim 8, wherein the second portion of the wireless device is positioned relative to the antenna of the wireless device such that a total radiated power (TRP) of the antenna of the wireless device when the external case is coupled to the wireless device and the wireless device is operational substantially corresponds to a TRP of the antenna of the wireless device when the external case is not coupled to the wireless device and the wireless device is operational.

12. The apparatus of claim 8, wherein:
a portion of the external case corresponding to the first portion of the side of the wireless device has a size along a dimension greater than a size along the dimension of a portion of the external case corresponding to the second portion of the side of the wireless device.

13. The apparatus of claim 8, wherein:
the external case has an inner liner and an outer shell, a perimeter of the inner liner of the external case being less than a perimeter of the outer liner of the external case.

14. The apparatus of claim 8, wherein:
the external case has an inner liner and an outer shell, the antenna of the external case being disposed between the inner line and the outer shell, the antenna of the external case overlaying the first portion of the side of the wireless device when the external case is coupled to the wireless device.

15. The apparatus of claim 8, wherein the antenna of the external case is formed on a flexible printed circuit board (FPCB).

16. An apparatus, comprising:
an external case configured to be coupled to a wireless device having a housing separate from the external case,
the external case having an antenna that operatively couples to an antenna of the wireless device when the external case is coupled to the wireless device and the wireless device is operational, the external case covering a first portion of a housing of the wireless device and not covering a second portion of the housing of the wireless device when the external case is coupled to the housing of the wireless device, the second portion of the housing of the wireless device being mutually exclusive from the first portion of the housing of the wireless device, the antenna of the external case being laterally offset from the second portion of the wireless device and the antenna of the wireless device when the external case is coupled to the wireless device.

17. The apparatus of claim 16, wherein the antenna of the external case overlays at least a portion of the first portion of the housing of the wireless device when the external case is coupled to the wireless device.

18. The apparatus of claim 16, wherein:

the antenna of the external case overlays at least a portion of the first portion of the housing of the wireless device when the external case is coupled to the wireless device the antenna of the external case does not overlay at least a portion of the antenna of the wireless device and does not overlay the second portion of the wireless device when the external case is coupled to the wireless device.

19. The apparatus of claim 16, wherein:

the antenna of the external case is formed on a flexible printed circuit board (FPCB), the FPCB overlays at least a portion of the first portion of the housing of the wireless device when the external case is coupled to the wireless device the FPCB does not overlay at least a portion of the antenna of the wireless device and does not overlay the second portion of the wireless device when the external case is coupled to the wireless device.

20. The apparatus of claim 16, wherein the external case is positioned relative to the wireless device when coupled together such that a total radiated power (TRP) of the antenna of the wireless device when the external case is coupled to the wireless device and the wireless device is operational substantially corresponds to a TRP of the antenna of the wireless device when the external case is not coupled to the wireless device and the wireless device is operational.

\* \* \* \* \*